United States Patent [19]
Jurgenson

[11] Patent Number: 5,717,549
[45] Date of Patent: Feb. 10, 1998

[54] LOW PROFILE HEAD DISK ASSEMBLY IN WHICH THE ACTUATOR MEMBER AND THE DISKS OF THE ASSEMBLY ARE NONOVERLAPPING

[75] Inventor: Ryan A. Jurgenson, Hutchinson, Minn.

[73] Assignee: Hutchinson Technology Incorporated, Hutchinson, Minn.

[21] Appl. No.: 398,128

[22] Filed: Mar. 3, 1995

Related U.S. Application Data

[63] Continuation of Ser. No. 73,778, Jun. 8, 1993, abandoned, which is a continuation-in-part of Ser. No. 706,868, May 29, 1991, abandoned.

[51] Int. Cl.⁶ .................................. G11B 5/55; G11B 5/48
[52] U.S. Cl. ..................................... 360/106; 360/104
[58] Field of Search .......................... 360/97.01–98.01, 360/104–106

[56] References Cited

U.S. PATENT DOCUMENTS

| | | | |
|---|---|---|---|
| 4,796,122 | 1/1989 | Levy | 360/98.01 |
| 4,947,275 | 8/1990 | Hinlein | 360/104 |
| 5,109,310 | 4/1992 | Ohkjita | 360/106 |
| 5,184,265 | 2/1993 | Foote | 360/106 |
| 5,189,574 | 2/1993 | Imamura | 360/103 |
| 5,189,577 | 2/1993 | Nishida | 360/106 |
| 5,198,945 | 3/1993 | Blaeser et al. | 360/104 |
| 5,202,804 | 4/1993 | Takekado | 360/106 |
| 5,214,552 | 5/1993 | Haga | 360/106 |
| 5,243,479 | 9/1993 | Nakagoshi | 360/98.01 |
| 5,260,846 | 11/1993 | Iriko | 360/106 |
| 5,315,467 | 5/1994 | Yoshida | 360/106 |
| 5,319,512 | 6/1994 | Grapenthin | 360/106 |
| 5,363,260 | 11/1994 | Kawakami | 360/106 |
| 5,381,289 | 1/1995 | Fiedler | 360/104 |
| 5,396,388 | 3/1995 | Brown | 360/106 |
| 5,442,505 | 8/1995 | Forbord | 360/106 |
| 5,495,375 | 2/1996 | Baasch et al. | 360/104 |

FOREIGN PATENT DOCUMENTS

| | | | |
|---|---|---|---|
| 59-218666 | 12/1984 | Japan. | |
| 3-168985 | 7/1991 | Japan | 360/104 |

*Primary Examiner*—Jefferson Evans
*Attorney, Agent, or Firm*—Faegre & Benson LLP

[57] ABSTRACT

An improved low profile magnetic head disk assembly is used with dynamic magnetic information storage devices or rigid disk drives. The HDA includes a head mounted to a suspension, wherein the suspension base plate is an integral part of the actuator plate. Each actuator plate is in close registration with a bearing. The actuator assembly positions the head in close proximity with the rigid disk surfaces, with the actuator plates positioned exterior to the disks and not passing over the surface of the disks. The actuator plates may be a single piece for each disk, two pieces (one for each suspension), or three pieces (two actuator plates and one spacer). The center line of the actuator plate(s), with or without the spacer, is at the center line of the disk, thus reducing the total HDA height.

37 Claims, 4 Drawing Sheets

LOW PROFILE HEAD DISK ASSEMBLY IN WHICH THE ACTUATOR MEMBER AND THE DISKS OF THE ASSEMBLY ARE NONOVERLAPPING

CROSS-REFERENCE TO RELATED APPLICATION

This application is a Continuation of Ser. No. 08/073,778 filed Jun. 8, 1993, now abandoned, which is a Continuation-In-Part of Ser. No. 07/706,868 filed May 29, 1991, now abandoned.

FIELD OF THE INVENTION

This present invention pertains to an improved magnetic head disk assembly (HDA) for use with dynamic magnetic storage devices or rigid disk drives. More specifically, the present invention provides a low profile magnetic head disk assembly (HDA) that decreases the total height of the HDA and disk drive and improves manufacturability.

BACKGROUND OF THE INVENTION

Currently, the storage industry is experiencing a need for very small, low capacity, disk drives that can be manufactured and sold at low cost. Applications for such devices would be in the areas requiring very small packages such as notebook personal computers. Accordingly, there is a need for a low cost, low height HDA for small disk drives.

Conventionally, suspension base plates are welded to one end of suspension load beams and the base plates are used to attach the suspensions to the actuator arms. These suspensions are positioned vertically between their actuator arm and the respective disk surface, such that the height of the HDA is significantly high. The present invention uses a load beam welded to an actuator plate, so that the same structure is then acting both as the actuator and the suspension base plate, such that the actuator plate is in the same plane as the disk and the suspension is not positioned between the actuator arm and a disk. Therefore, the overall height of the head disk assembly (HDA) is reduced. For a single disk application, the space savings is approximately 1.27 mm (0.050") or about 37% of the total disk stack height.

Some prior art configurations have incorporated a load beam welded to an actuator arm in very large disk drives to reduce the space requirements. In those devices, however, the arm passed over the disk and the actuator arms were not directly positioned around a bearing. Instead, these prior art actuator arms were registered to a separate positioner that was in contact with the bearing. Further, prior art actuators for large disk drives that extend over disks have high inertia, which is undesirable. According to an embodiment of the present invention, the actuator plates do not pass over the disk, they facilitate the use of the suspension in very small disk drives, and they are closely coupled to the bearing assembly.

The present invention also provides an embodiment in which the actuator plates do pass over the disk but the inertia is kept low by providing a construction wherein the arms are very thin and short (suitable for small disk drives).

The prior art suspensions heretofore incorporated actuator arm assemblies for large disk drives having several complicated pieces and spacers, while the present invention utilizes an easy to manufacture arm and spacer suitable for small disk drives.

BRIEF DESCRIPTION OF THE INVENTION

In a low profile rigid disk drive assembly or magnetic head disk drive assembly, which includes a rigid disk and head stack assembly, the head stack assembly consists essentially of:

a. two actuator plates stacked back to back, such that a center line between them is coplanar with a disk center line, and the actuator plates are rotatable about a common axis, such that the plates do not extend over a surface of the disk, even when the actuator plates are at a limit of movement closest to a center point of the disk;

b. a bearing rotatable about the common axis and fixing the actuator plates to the disk drive;

c. first and second load beams attached to first and second sides of each actuator plate, such that the load beams form outermost portions of a head stack assembly;

d. a gimbal forming a part of or attached to each load beam; and e. a read/write head associated with each gimbal for operationally interacting with the surface of the disk.

The basic element of one embodiment of the low profile HDA provided by this invention is the use of a stampable actuator plate that is welded to a single load beam to form a single assembly. Two or more of these assemblies are pressed onto a bearing, thus eliminating the E-Block actuator of conventional HDAs. In addition to achieving a major cost reduction, the overall stack height for the HDA according to this invention may be reduced by 35% over that of a conventional HDA.

It is an object of the present invention to provide an improved head disk assembly having a unitary actuator and suspension base plate structure.

It is another object of the present invention to provide a head stack or head disk assembly having reduced vertical spacing of the disks.

A further object of the present invention is to offer a head disk assembly that is easy and inexpensive to manufacture and assemble with a reduced number of components.

These and other objects of the present invention will be apparent with reference to the drawings, the description of the preferred embodiment and the claims.

DETAILED DESCRIPTION OF THE INVENTION

The head disk drive assembly of the present invention overcomes the limitations of the prior art by making the base plate and the actuator as a single unitary piece. In doing so, the manufacture of the head disk assembly components is greatly simplified, while the overall height of the assembly is reduced.

Figure 5:
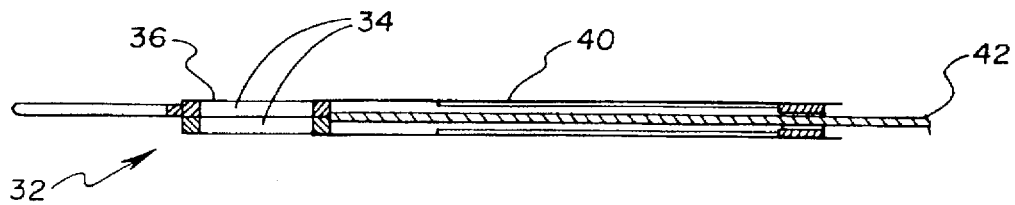
FIG. 5 is a profile view of the embodiment of FIG. 3 with a single disk.
Figure 8:
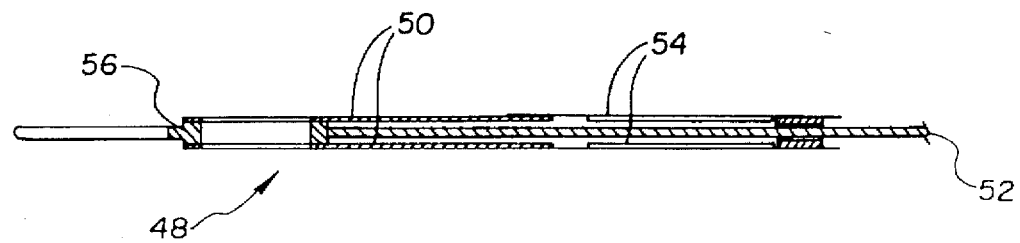
FIG. 8 is a profile view of the embodiment of FIG. 6 with a single disk.
Figure 9:
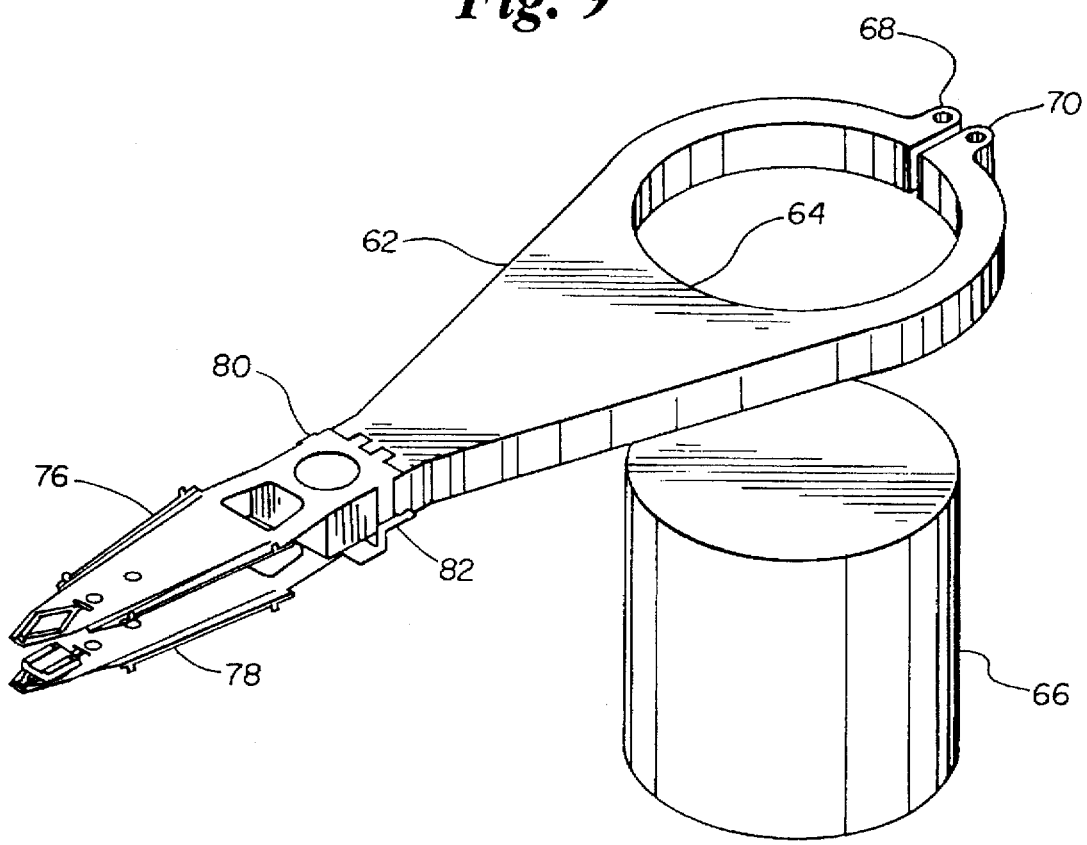
FIG. 9 is a perspective view of an additional embodiment of the invention.

More specifically, the head disk assembly of the present invention includes a head mounted to a suspension, wherein the suspension base plate is an integral part of the actuator plate. Each actuator plate is placed in close registration with a bearing conventional in the art and is pressed or glued in position or fixed with a similar process. The actuator assembly positions the heads or sliders mounted at the ends of the load beams for controlled tracking over the rigid disk surfaces, such that the actuator plates do not pass over the disks. The actuator plates may be provided in a single piece embodiment for each disk (as illustrated in FIG. 9), two pieces (one for each suspension—as illustrated in FIG. 5), or three pieces (two actuator plates and one spacer—as illustrated in FIG. 8). The center line of the actuator(s), with or without the spacer, is in the same plane as the disk, and the load beams form the outermost components of the assembly such that the total height of the head disk assembly is reduced.

Figure 1:
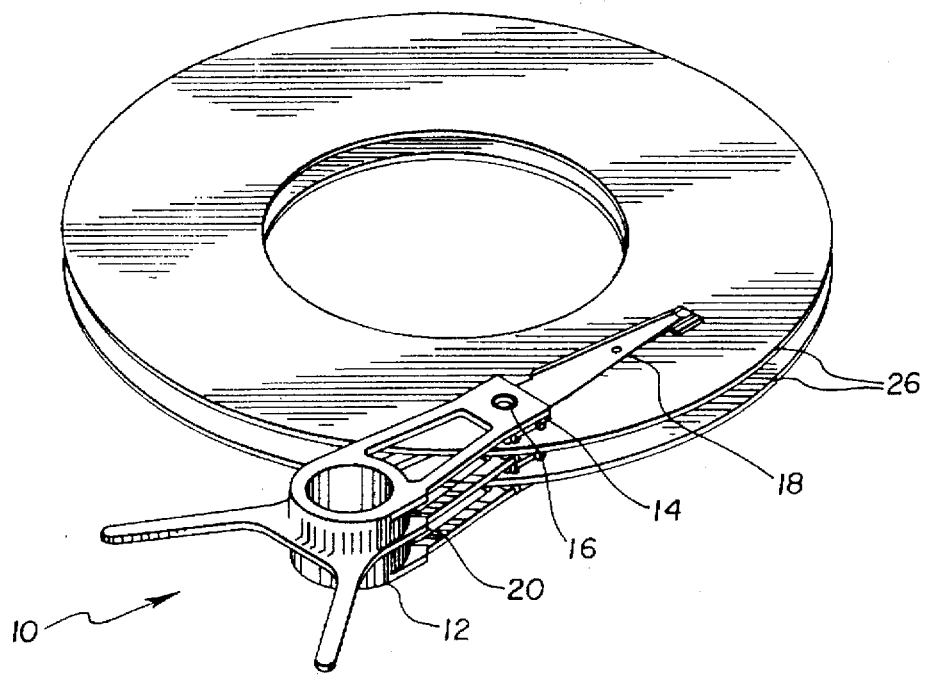
FIG. 1 is perspective view of a prior art head disk drive assembly.
Figure 2:
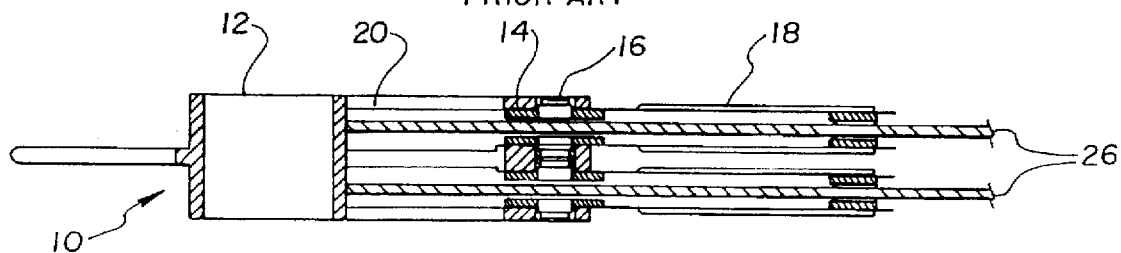
FIG. 2 is a profile view of the prior art head disk drive assembly of FIG. 1.

Referring now to the drawings, FIGS. 1 and 2 show a prior art swage technology head disk drive assembly 10 with an E-Block type actuator 12. E-Block 12 is typically cast or extruded and then the suspension contact area 14 of the projecting actuator arms 20 thereof is machined flat. Next, swage holes 16 are drilled, reamed or electrical discharge machined. Finally, head suspension assemblies (HSA) 18 are swaged to actuator plates 20. Notice that the ends of actuator plates 20 are between disks 26, such that each HSA 18 is sandwiched between its respective contact area 14 and disk 26. This, along with the swage technology, limits the ability to reduce HDA height.

Figure 3:
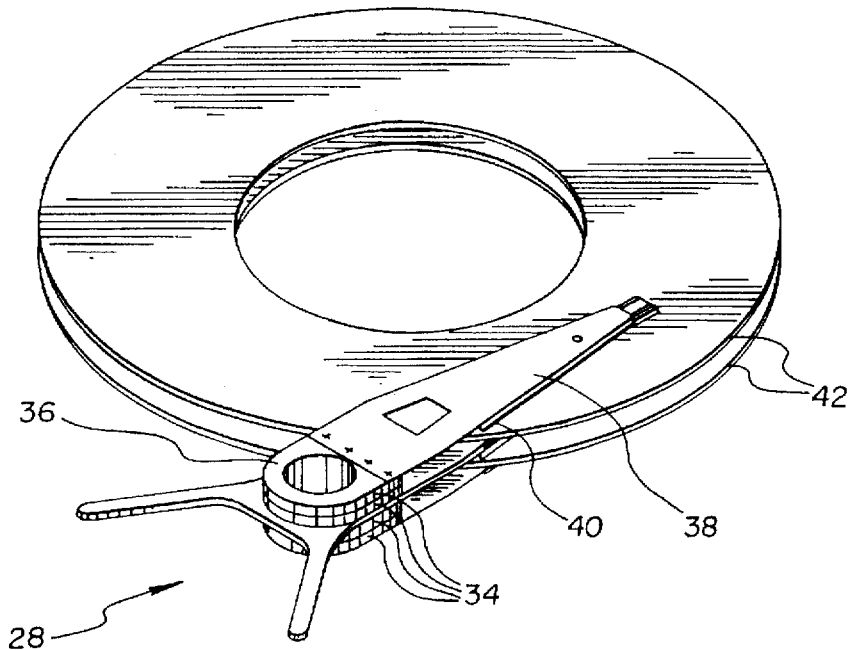
FIG. 3 is a perspective view of an embodiment of the present invention in which the actuator plates do not pass over the disk.
Figure 4:
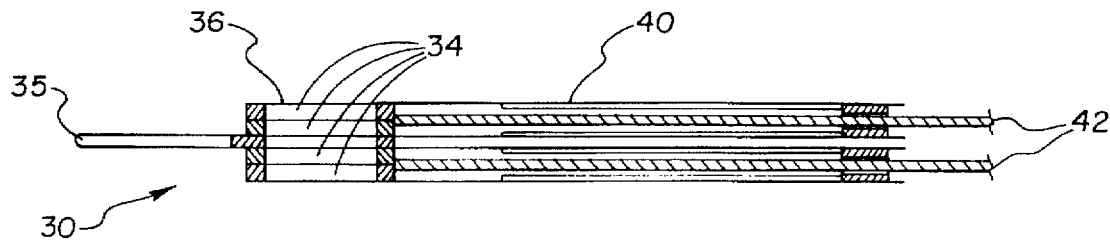
FIG. 4 is a profile view of the embodiment of FIG. 3 with multiple disks.

FIGS. 3, 4 and 5 illustrate one embodiment of a low profile HDA 28 of the present invention, with multiple 30 and single disk configurations 32, shown in FIGS. 4 and 5, respectively. Note that the single piece, machined E-Block has been eliminated and replaced with individual stacked actuator plates 34 having an aperture 36 for positioning around a conventional bearing (not shown). Plates 34 may be attached to the bearing using a number of different processes. For example, a suitable adhesive may be used to secure the plates to the bearing or one of a number of interference fit techniques may be used. Interference fit by use of thermal shrink techniques which may be combined with press fit techniques may all be used.

Load beams 38 are directly attached, for example by welding, to actuator plates 34. In this embodiment, the actuator plates are configured to remain exterior to the disks by not passing over the surface of the disk and the load beams for the outermost portions of the stack assembly, thereby permitting substantial reductions in the height of the HDA.

Therefore, use of the structure shown in FIGS. 3–5 allows the following processes to be eliminated:

extrusion or casting of a complex E-Block and its unitary actuator arm structure.

machining of surfaces which are to be swage connected to load beams. In the present invention the actuator arms can be stamped and no special machining is necessary preparatory to the forming of the weld connection.

drilling and reaming of holes for swage connection which are unneeded for connections using the direct weld or clamped embodiments of the present invention.

swaging.

Because the relatively thinner load beams 38 are the outermost portion of the entire HDA stack 28 rather than increasing the height of the slider and load beam assembly, the total HDA height may be substantially reduced, using the teachings of the present invention, over that possible with the prior art. If desired, load beams 38 may have reverse rails 40 which extend in the direction of the surface of the disk. The multiple disk configuration 30 has four actuator plates 34 and one spacer 35 (FIG. 4), while the single disk configuration 32 has two actuator plates 34 and does not require the use of a spacer (FIG. 5). Note that shorter actuator plates 34 of the embodiment of this invention shown in FIGS. 3–5 have a thicker dimension than the longer actuator plates 56 of the embodiment of this invention shown in FIGS. 6–8, thus permitting the use of fewer spacers, as will be described further herein. Further, using the present invention, the spacing between disks 42 may be substantially lower than spacing achievable using prior art techniques and compares to the spacing achieved with the interlocking swage head suspension connection technology for disc drive having more than four disks, as disclosed in commonly assigned U.S. Pat. No. 5,172,286, issued Dec. 15, 1992. Even greater relative space savings are realized for disk drives using four disks of fewer, due to the fact that, according to the present invention, the load beams form the outermost components of the stack assembly.

Figure 6:
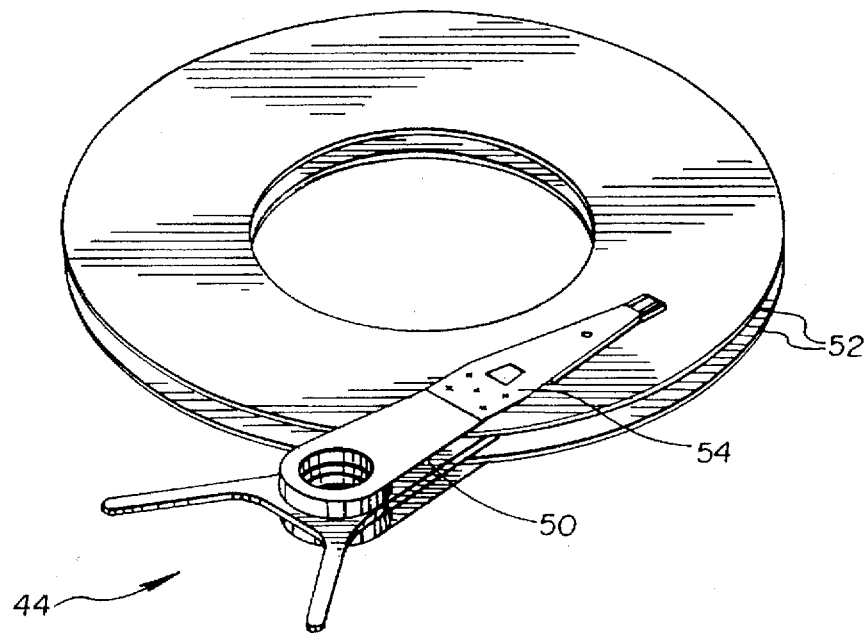
FIG. 6 is a perspective view of an embodiment of the present invention in which the actuator plates pass over the disk, but are relatively thin and short and are positioned between the load beams and disk.
Figure 7:
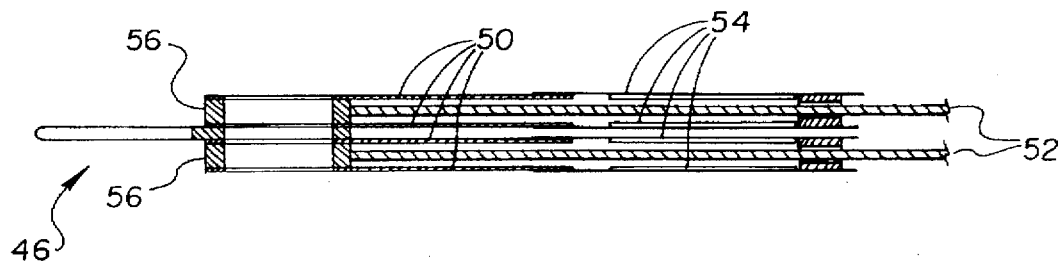
FIG. 7 is a profile view of the embodiment of FIG. 6 with multiple disks.

FIGS. 6, 7 and 8 illustrate a second embodiment of the low profile HDA 44 of the present invention, with multiple 46 and single disk configurations 48, shown in FIGS. 7 and 8, respectively. In these embodiments, actuator plates 50 pass over disk 52 surfaces, but they are between load beams 54 and disks 52. Thus, the total HDA height of the second embodiment 44 is the same as that of the first embodiment 28. The second embodiment 44 has more inertia than the first embodiment 28, but offers the ability to use shorter load beams 54. Shorter load beams 54 may typically demonstrate improved resonance performance. This multiple disk configuration 46 has four actuator plates 50 and three spacers 56 (FIG. 7), while the single disk configuration 48 has two actuator plates 50 and one spacer 56 (FIG. 8). Note that, since actuator plates 50 of the embodiment of this invention shown in FIGS. 6–8 have a thinner dimension than the actuator plates 34 of the embodiment shown in FIGS. 3–5, spacers 56 are required to be positioned between each of the actuator plates to maintain proper alignment of the load beams and their heads or sliders to the disks.

FIG. 9 illustrates a third embodiment for a low profile HDA in accordance with the present invention. In this embodiment, the actuator plate 62 has an opening 64 which can be positioned around a separate cylindrical bearing piece 66 and secured by releasing tabs 68 and 70 to spring back to create an interference fit between opening 64 and bearing 66.

The unitary actuator plate 62 has upper 76 and lower 78 load beams mounted adjacent to its upper and lower surfaces respectively. In the embodiment shown, the load beams 76, 78 are secured to the actuator plate 62 using resilient retaining clips 80 and 82, as disclosed in commonly assigned U.S. Pat. No. 5,198,945, issued Mar. 30, 1993, which is incorporated herein by reference, such clip structures may be unitary with the load beams 76 and 78 or separate structures. This embodiment is relatively simple to construct since it does not require the use of the complex E-block structure and the connection of load beams 76 and 78 to the actuator plate 62 is easily accomplished, but allows for removal and reconnection in the event that repairing or rebuilding of the assembly becomes necessary.

What is claimed is:

1. A rigid disk drive assembly, which includes a rigid disk stack assembly and a head stack assembly, said head stack assembly consisting of:
   at least two actuator plates, stacked back to back in the head stack assembly, such that a center line between the actuator plates is coplanar with a disk stack assembly center line, said actuator plates being rotatable about a common axis, such that the actuator plates do not extend over a surface of any disk in the disk stack assembly, even when the actuator plates are at a limit of movement closest to a center point of the disk, and such that the number of actuator plates is equal to the number of disks;
   a bearing rotatable about said common axis and fixing said actuator plates to a disk drive;
   first and second load means attached to first and second surfaces of each actuator plate, respectively, such that the first and a last load beams form outermost portions of the head stack assembly;
   gimbal means associated with each load beam means; and
   read/write head means associated with each gimbal means for operative interaction with the surface of the disk of the disk stack assembly with which the read/write head means is in read/write relationship.

2. The disk drive assembly according to claim 1, wherein said load beams are welded to said actuator plates.

3. The disk drive assembly according to claim 1, wherein said actuator plates are formed by stamping.

4. The disk drive assembly according to claim 1, wherein said load beams are bonded to said actuator plate.

5. The disk drive assembly according to claim 1, wherein said load beams are attached to said actuator plate by an interference fit.

6. A rigid disk drive assembly, which includes a rigid disk stack assembly and a head stack assembly, said head stack assembly consisting of:
   at least one actuator plate having a center line coplanar with a disk center line, each said actuator plate being rotatable about an axis without extending over a surface of any disk in the disk stack assembly, even when each said actuator plate is at a limit of movement closest to a center point of each said disk;
   a bearing rotatable about said axis and fixing each said actuator plate to a disk drive;
   two load beams attached to each said actuator plate on opposite sides thereof, such that said load beams form outermost portions of the head stack assembly;
   gimbal means associated with each load beam; and
   a read/write head associated with each gimbal means for operative interaction with the surface of each said disk.

7. The disk drive assembly according to claim 6, wherein said load beams are welded to said actuator plate.

8. The disk drive assembly according to claim 6, wherein said load beams are attached to said actuator plate using a clip.

9. A low profile magnetic head disk drive assembly for a magnetic information storage device, which includes a rigid disk stack assembly and a head stack assembly, said head stack assembly consisting of:
   (a) at least two actuator plates stacked back to back in the head stack assembly, such that an actuator plate is above a plane of a disk and another actuator plate is below an opposite plane of the same disk, respectively, said actuator plates being rotatable about a common axis, such that said common axis is parallel to an axis of rotation of the disk stack assembly;
   (b) a bearing rotatable about the common axis and fixing said actuator plates to a disk drive housing;
   (c) first and second load beams, attached to first and second opposite sides of each actuator plate, respectively, such that the load beams form outermost portions of the head stack assembly;
   (d) gimbal means associated with each load beam; and
   (e) magnetic read/write head means mounted on each gimbal means for operative interaction with a surface of an associated disk.

10. The head disk assembly according to claim 9, wherein said actuator plates are spaced apart with spacers fixed to said bearing and rotatable about said actuator plate axis.

11. The head disk assembly according to claim 9, wherein said load beams are welded to said actuator plates.

12. The head disk assembly according to claim 9, wherein said actuator plates are formed via stamping.

13. The head disk assembly according to claim 9, wherein said load beams are attached to each actuator plate, such that a center line for each pair of actuator plates is coplanar with a center line of their respective disk.

14. The head disk assembly according to claim 9, wherein said load beams are bonded to said actuator plates.

15. The head disk assembly according to claim 9, wherein said load beams are attached to said actuator plates via an interference fit, such as pressing or clipping.

16. A low profile magnetic head disk drive assembly for a magnetic information storage device, which includes a rigid disk stack assembly and a head stack assembly, said head stack assembly consisting of:
   (a) at least first and second actuator plates stacked back to back with each disk of the disk stack assembly, such that a center line between said actuator plates is coplanar with a center line of each said disk, and said actuator plates are rotatable about a common axis;
   (b) a bearing rotatable about said common axis and fixing said actuator plates to a disk drive housing;
   (c) at least one load beam attached to each actuator plate, such that load beams form outermost portions of the head stack assembly;
   (d) gimbal means associated with each load beam; and
   (e) magnetic read/write head means associated with each gimbal means for operative interaction with a surface of each said disk.

17. The head disk assembly according to claim 16, wherein said actuator plates are spaced apart with spacers fixed to said bearing and rotatable about said common axis.

18. The head disk assembly according to claim 16, wherein said load beams are welded to said actuator plates.

19. The head disk assembly according to claim 16, wherein said actuator plates are formed via stamping.

20. The head disk assembly according to claim 16, wherein said load beams are attached to each actuator plate, such that a center line for each pair of actuator plates is coplanar with a center line of their respective disk.

21. The head disk assembly according to claim 16, wherein said load beams are bonded to said actuator plates.

22. The head disk assembly according to claim 16, wherein said load beams are attached to said actuator plates via an interference fit, such as pressing or clipping.

23. The head disk assembly of claim 1, 6, 9, or 16 wherein the actuator plates are attached to the bearing.

24. The head disk assembly of claim 23 wherein the actuator plates are attached to the bearing by an interference fit.

25. The head disk assembly of claim 24 wherein the interference fit is a press fit.

26. The head disk assembly of claim 24 wherein the interference fit is a thermal shrinkage fit.

27. The head disk assembly of claim 24 wherein the interference fit is provided by means of a retaining ring.

28. The head disk assembly of claim 23 wherein the actuator plates are attached to the bearing by means of adhesive.

29. A low profile, information-storing disk drive, comprising a disk stack assembly and a head stack assembly disposed in the disk drive, wherein:

(a) the disk stack assembly comprises a plurality of information-storing disks to be operationally engaged; and (b) the head stack assembly comprises:

(i) an actuator member, wherein the actuator member is pivotable about an actuator axis through a range of motion extending from a first limit of movement to a second limit of movement, wherein the actuator member is configured such that no portion of the actuator member extends over a surface of any disk of the disk stack assembly as the actuator member pivots through said range of motion, and wherein the actuator member comprises a plurality of actuator plates stackable on an actuator hub;

(ii) a plurality of load beam members, wherein each load beam member comprises a distal end and a mounting end, wherein the mounting end of each load beam member is welded to a surface of a corresponding actuator plate to provide a welded connection between each said load beam member and each said corresponding actuator plate such that each load beam member overlies a surface of a corresponding information-storing disk to be operationally engaged and such that a side of each of the actuator plates to which a corresponding one or more of the load beams is mounted extends radially from the actuator axis a distance equal to or less than the shortest distance between the actuator axis and the outer circumference of the disk stack; and (iii) a plurality of transducer heads, wherein a transducer head is attached to the distal end of each load beam member for operative interaction with the surface of the corresponding information-storing disk.

30. The low profile information-storing disk drive of claim 29, wherein each load beam member is mounted to a surface of a corresponding actuator plate such that said corresponding actuator plate and the corresponding information-storing disk are coplanar.

31. The low profile information-storing disk drive of claim 29, wherein each load beam member is mounted directly to a surface of a corresponding actuator plate such that said corresponding surface functions as a reinforcing plate for the corresponding load beam member.

32. The low profile information-storing disk drive of claim 29, wherein the actuator member comprises at least one actuator plate for each information-storing disk of the disk stack assembly.

33. The low profile information-storing disk drive of claim 29, wherein the actuator member comprises at least two actuator plates for each information-storing disk of the disk stack assembly.

34. The low profile information-storing disk drive of claim 29, wherein the actuator member includes an aperture for mounting the actuator member onto an actuator hub, and wherein the actuator member further includes an opening on the peripheral edge of the actuator member, said opening being in communication with the aperture such that the aperture of the actuator member is capable of providing an interference fit between the actuator member and the actuator hub.

35. The low profile information-storing disk drive of claim 34, wherein the actuator member further comprises at least two releasing tabs disposed proximal to the opening of the actuator member, wherein the releasing tabs can be biased towards each other to help secure the actuator member to the actuator hub.

36. A low profile, information-storing disk drive, comprising:

(a) an information-storing disk to be operationally engaged;

(b) a low profile head assembly, comprising (i) an actuator plate, wherein the actuator plate is pivotable about an actuator axis through a range of motion extending from a first limit of movement to a second limit of movement, wherein the actuator plate is configured such that the actuator plate and the information-storing disk are nonoverlapping as the actuator plate pivots through said range of motion;

(ii) a load beam member having a distal end and a mounting end, wherein the mounting end of the load beam member is welded to the actuator plate to provide a welded connection between each said load beam member and said actuator plate such that the load beam member overlies a surface of the information-storing disk to be operationally engaged and such that a side of the actuator plate to which the load beam member is mounted extends radially from the actuator axis a distance equal to or less than the shortest distance between the actuator axis and the outer circumference of the disk; and (iii) a transducer head attached to the distal end of the load beam member for operative interaction with the surface of the information-storing disk.

37. A head stack assembly for mounting to an actuator hub, wherein the head stack assembly comprises a plurality of suspension/actuator plate assemblies, wherein each suspension/actuator plate assembly comprises:

(a) an actuator plate provided with an aperture adapted for mounting to the actuator hub such that the actuator plate is movable through a range of motion from a first limit of movement to a second limit of movement;

(b) a suspension having a distal end and a mounting end, wherein the mounting end of the suspension is directly mounted to the actuator plate without an intervening reinforcing plate; and (c) a transducer head attached to the distal end of the suspension for operative engagement with the surface of a corresponding information-storing disk; and wherein the actuator plate is configured such that the actuator plate and the corresponding information-storing disk are nonoverlapping as the actuator plate moves through said range of motion, and a side of the actuator plate to which the suspension is mounted extends radially from a rotational axis of the actuator plate a distance equal to or less than the shortest distance between the rotational axis and the outer circumference of the information-storing disk.

* * * * *

UNITED STATES PATENT AND TRADEMARK OFFICE
CERTIFICATE OF CORRECTION

PATENT NO.  :  5,717,549
DATED       :  February 10, 1998
INVENTOR(S) :  Jurgenson It is certified that error appears in the above-indentified patent and that said Letters Patent is hereby corrected as shown below:

In Column 8, line 51, delete "mounted" and insert --welded--

Signed and Sealed this

Twelfth Day of May, 1998

Attest:

BRUCE LEHMAN

*Attesting Officer*            *Commissioner of Patents and Trademarks*